United States Patent
Wannenmacher

(10) Patent No.: US 7,251,465 B2
(45) Date of Patent: Jul. 31, 2007

(54) METHOD AND APPARATUS FOR PRODUCING MOBILE RADIO SIGNALS

(75) Inventor: Volker Wannenmacher, München (DE)

(73) Assignee: Siemens Aktiengesellschaft, Munich (DE)

( * ) Notice: Subject to any disclaimer, the term of this patent is extended or adjusted under 35 U.S.C. 154(b) by 498 days.

(21) Appl. No.: 10/471,983

(22) PCT Filed: Feb. 19, 2002

(86) PCT No.: PCT/DE02/00599

§ 371 (c)(1),
(2), (4) Date: Sep. 15, 2003

(87) PCT Pub. No.: WO02/075941

PCT Pub. Date: Sep. 26, 2002

(65) Prior Publication Data

US 2004/0121744 A1    Jun. 24, 2004

(30) Foreign Application Priority Data

Mar. 15, 2001    (DE) ............................... 101 12 575

(51) Int. Cl.
*H01Q 11/12*    (2006.01)
(52) U.S. Cl. ...................... 455/118; 455/255; 455/209; 331/18; 331/19; 331/20; 331/21; 331/22
(58) Field of Classification Search ................ 455/118, 455/225, 209; 331/18–22
See application file for complete search history.

(56) References Cited

U.S. PATENT DOCUMENTS

| | | | |
|---|---|---|---|
| 4,395,777 A * | 7/1983 | Oki et al. ................ | 455/183.2 |
| 5,740,521 A | 4/1998 | Hulkko et al. | |
| 5,822,366 A | 10/1998 | Rapeli | |
| 5,896,562 A | 4/1999 | Heinonen | |
| 6,073,000 A * | 6/2000 | Shinohara .................... | 455/310 |
| 6,714,765 B1 * | 3/2004 | Kimppa ....................... | 455/76 |
| 6,960,962 B2 * | 11/2005 | Peterzell et al. ............... | 331/40 |
| 2002/0176354 A1 * | 11/2002 | Chiodini ..................... | 370/208 |

FOREIGN PATENT DOCUMENTS

| | | |
|---|---|---|
| DE | 694 20 621 | 6/1993 |
| DE | 41 26 915 | 10/1997 |

(Continued)

OTHER PUBLICATIONS

Thomas H. Lee, "Superharmonic Injection-Locked Frequency Dividers", Jun. 1999, IEEE Journal of Solid-State Circuits, Vol. 34, No. 6.*

Thomas H. Lee, "Superharmonic Injection-Locked Frequency Dividers", Jun. 1999, IEEE Journal of Solid-State Circuits, Vol. 34, No. 6.*

E. S. Ferre-Pikal et al., "Low PM Noise Rengenerative Dividers", pp.478-484.

(Continued)

*Primary Examiner*—Duc M. Nguyen
*Assistant Examiner*—Eric J Elcenko
(74) *Attorney, Agent, or Firm*—Bell, Boyd & Lloyd LLP

(57) ABSTRACT

A method and device are provided for producing mobile radio signals, which utilize a direct conversion receiver, at least one first and one second local oscillator and one regenerative divider for processing signals according to different mobile radio standards. For generating the intermediate frequency for transmission according to at least one of the mobile radio standards, a division by four in addition to a division by three of the oscillator frequency is also possible.

6 Claims, 2 Drawing Sheets

FOREIGN PATENT DOCUMENTS

| | | |
|---|---|---|
| EP | 0 800 283 | 3/1997 |
| EP | 1 001 548 | 11/1999 |
| EP | 1 059 734 | 12/2000 |
| WO | 97/30523 | 2/1996 |
| WO | 99/52221 | 4/1998 |
| WO | 99/31885 | 11/1998 |

OTHER PUBLICATIONS

Jon Strange et al., "A Direct Conversion Transceiver for Multi-Band GSM Application", pp. 25-28.
Philips Semiconductors, Sep. 2000.

* cited by examiner

METHOD AND APPARATUS FOR PRODUCING MOBILE RADIO SIGNALS

BACKGROUND OF THE INVENTION

Over the course of recent years, wireless communication networks and mobile radio networks have developed to become an important component in the communications infrastructure on a worldwide scale. As a result of the enormous demand for mobile radio capacity, various industry-standard communication technologies have been developed based on digital modulation techniques. Thus, for example, Code Division Multiple Access (CDMA), Time Division Multiple Access (TDMA) and frequency hopping techniques have been used in order to develop modern communication systems. Following parallel implementation of systems of these types, it has proven to be advantageous to provide receivers which are capable of operating with one or more of these standard techniques. In order to make this possible, it is necessary to provide a receiver which is capable of receiving signals that have been modulated using different modulation techniques.

In Central Europe, in particular, but also in other regions of the world, the GSM mobile radio system has been developed in this context, whereby different frequency ranges are made available within this system. The next few years will see the advent of the next generation of mobile radio standard (UMTS, 3G) which will encompass additional frequency ranges.

From the standpoint of the manufacturer of terminal equipment, it is, therefore, becoming increasingly more difficult to guarantee signal generation for the different bands and standards at an acceptable level of resource deployment and, conversely, to provide the corresponding receive facilities; in particular, on the condition that the number of oscillators used and their required tuning range should be kept as small as possible.

Known receivers for processing signals employing different modulation standards implement, for example, the double conversion receiver architecture. The double conversion receiver architecture is distinguished by the fact that the received radio signal is converted to an intermediate frequency signal and the intermediate frequency signal is then converted downward into the base band. In addition, the intermediate frequency is also delivered to a gain check. However, double conversion receivers have the disadvantage that they require a large number of circuitry components, which increases the costs, size and power draw of the receiver.

An alternative to these double conversion receivers is offered by direct conversion receivers which have no intermediate frequency and, therefore, have no resource requirement with respect to filtering for the intermediate frequency. For receiving, two-thirds or four-thirds of the oscillator frequency, which is used for downconversion of the receive signal into the base band, is optionally generated from a first local oscillator or from a second local oscillator via a regenerative divider.

In this situation, for transmission, use is made of the fact that the regenerative divider also generates one third of the oscillator frequency as a "waste product". This is subsequently IQ-modulated and delivered to an offset PLL (phase-locked-loop) which steps it up to the actual transmit frequency. For the special UTMS application situation, the output signal is generated by mixing with the first local oscillator since, in this case, an amplitude-modulated signal must be present, which cannot be achieved with an offset PLL.

The disadvantage of this solution is the fact that the first local oscillator must have a broad tuning range from 1282.5 to 1452.5 MHz. Not only is this difficult to implement but, under certain circumstances, it even necessitates the use of two separate oscillators for the respective sub-ranges. Furthermore, the offset PLL likewise contains two oscillators internally which make significant demands in terms of their space requirement.

An object of the present invention is, therefore, to provide a method and an apparatus of the generic type in which as small a number of oscillators as possible is used and the requisite tuning range is as small as possible. As such, the solution should be capable of being implemented as cost-effectively and simply as possible.

SUMMARY OF THE INVENTION

Firstly, a method is provided for generating mobile radio signals via a direct conversion receiver, using at least one first and one second local oscillator as well as a regenerative divider for dividing the respective oscillator frequency by three, for processing signals which conform to different mobile radio standards, wherein an intermediate frequency is produced during transmission for at least one of the mobile radio standards to be processed as a result of dividing one of the local oscillator frequencies by four.

A divider of this type having the factor 4 or a multiple thereof easily can be integrated in silicon without a major resource requirement.

By preference, the method of the present invention is designed in such a manner that, optionally, a frequency division by three or four can take place.

Apart from the two local oscillators described, it is also possible to use a larger number of local oscillators. In addition, by preference, the local oscillator frequency IQ divided by three or by four is modulated, whereby the modulated signal can be delivered jointly with one of the unmodulated local oscillator signals to an offset PLL or, alternatively, to a mixer.

The oscillator frequencies also can be higher than described above by an integer factor, such as by a factor of 2, whereby a division of the frequency by six or by eight would be required.

In addition, the present invention relates to an apparatus for generating mobile radio signals, for executing the method as described above.

Additional features and advantages of the present invention are described in, and will be apparent from, the following Detailed Description of the Invention and the Figures.

DETAILED DESCRIPTION OF THE INVENTION

Figure 1:
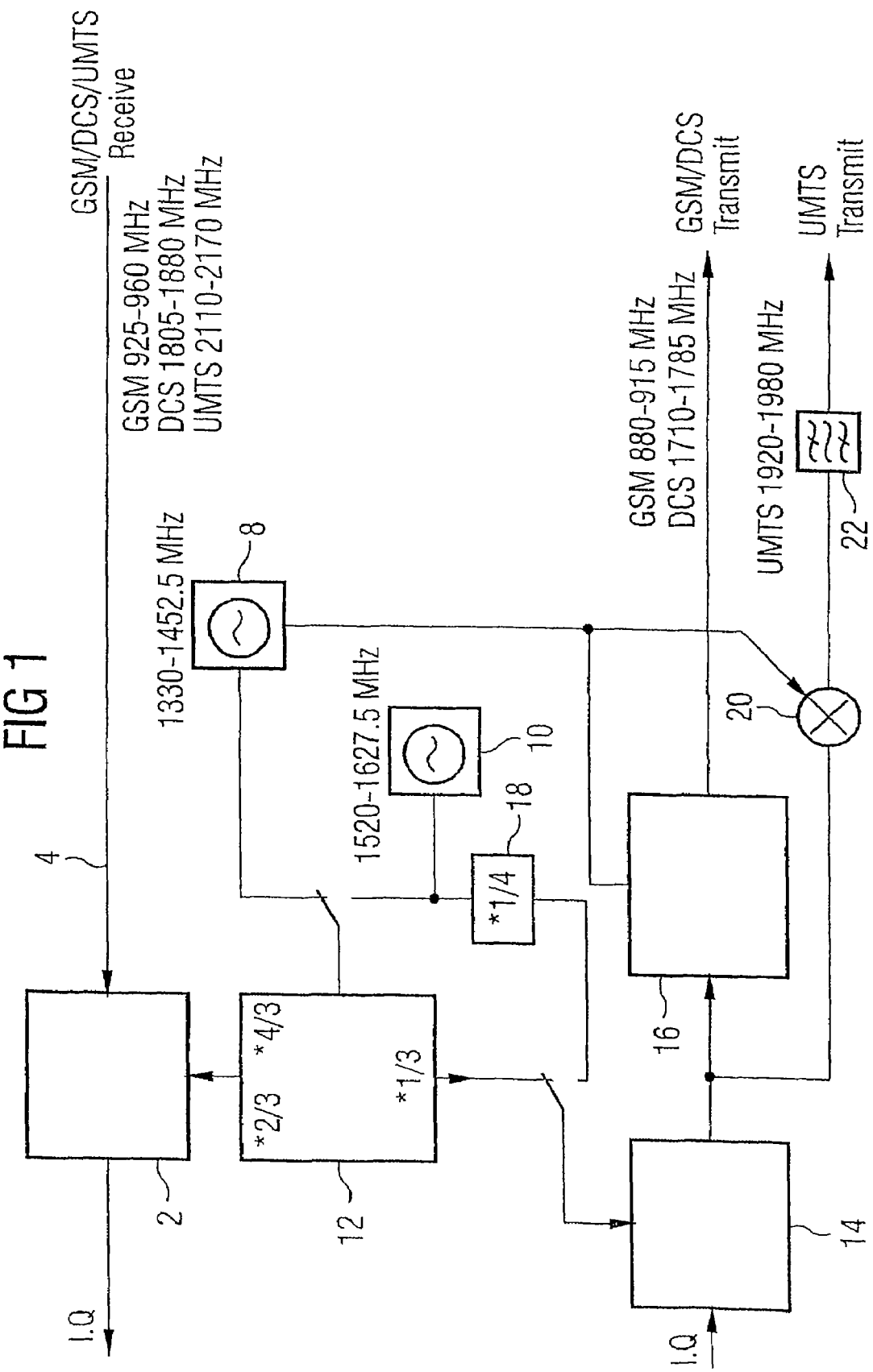
FIG. 1 shows an embodiment of an apparatus according to the teachings of the present invention.

FIG. 1 shows an embodiment of an apparatus for generating mobile radio signals in accordance with the present invention. In this situation, the apparatus includes a direct conversion receiver 2 which has no intermediate frequency and, therefore, has no resource requirement with respect to filtering for the intermediate frequency. With regard to the receive signal 4, the radio signals are GSM signals in the range 925 to 960 MHz, DCS signals in the range 1805 to 1880 MHz and UMTS signals in the range 2110 to 2170 MHz. In addition, the direct conversion receiver 2 has an IQ output 6. For receiving, two-thirds or four-thirds of the oscillator frequency, which is used for downconversion of the receive signal into the base band, is optionally generated from a first local oscillator 8 or from a second local oscillator 10 via a regenerative divider 12. For transmission, use is made of the fact that the regenerative divider 12 also generates one-third of the oscillator frequency as a "waste product" which is IQ-modulated in an IQ modulator 14 and subsequently delivered to an offset PLL 16. The offset PLL 16 steps it up to the actual transmit frequency. For UMTS, the output signal is generated by mixing 20 with the first local oscillator 8 since, in this case, an amplitude-modulated signal must be generated, which cannot be achieved with an offset PLL.

For transmission, the intermediate frequency for GSM and UMTS is produced by the regenerative divider 12 by dividing the second local oscillator frequency 10 by three. For DCS, however, the intermediate frequency is produced by dividing the second local oscillator frequency 10 by four. In this manner, the first local oscillator 8 needs to provide coverage in only a single range from 1330 to 1452.5 MHz and the second local oscillator 10 in a range from 1520 to 1627.5 MHz. The number of oscillators used in this situation remains unchanged.

Figure 2:
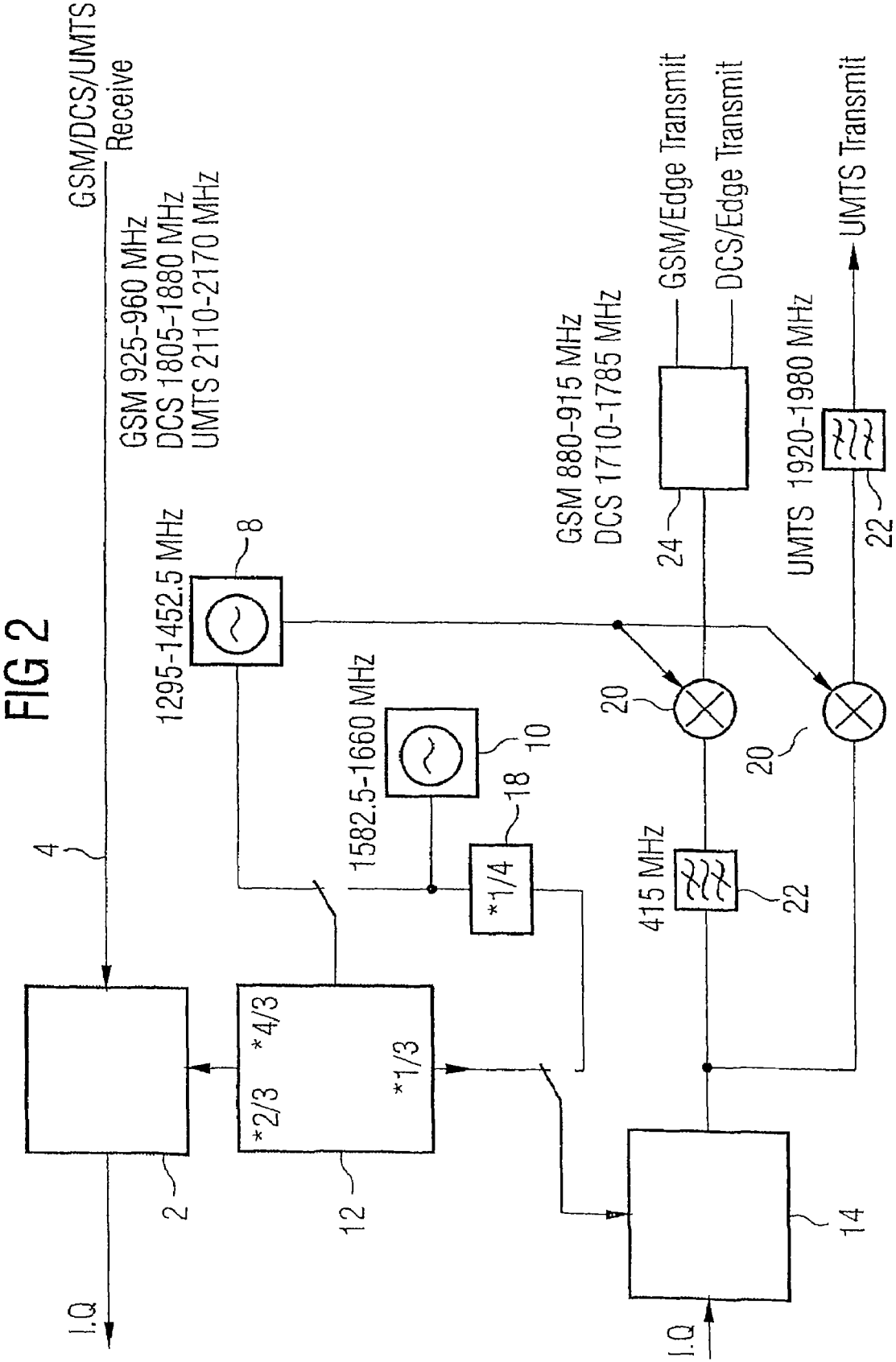
FIG. 2 shows an alternative embodiment of the apparatus from FIG. 1.

FIG. 2 shows an alternative embodiment of the apparatus from FIG. 1, whereby the same reference characters are used for the corresponding elements. In this case, the modulated intermediate frequency is filtered in a corresponding low-pass filter 22 and subsequently converted into the transmit band not via an offset PLL as shown in FIG. 1 but by mixing 24 with the first local oscillator 8. This makes it possible to transmit amplitude-modulated signals in the case of GSM and DCS, with the result that extensions of the standard, such as EDGE, for example, also can be taken into consideration. It is advantageous here that with the offset PLL the latter's oscillators are also dispensed with, whereby filtering measures such as a diplexer 24 and an LO lock are provided in contrast to the embodiment shown in FIG. 1.

Signal generation for the different bands and standards is guaranteed at an acceptable level of resource deployment and, conversely, the corresponding receive facilities are provided via the method presented and the corresponding apparatus, the number of oscillators used and their required tuning range is kept as small as possible.

Although the present invention has been described with reference to specific embodiments, those of skill in the are will recognize that changes may be made thereto without departing from the spirit and scope of the present invention as set forth in the hereafter appended claims.

The invention claimed is:

1. A method for producing mobile radio signals with a direct conversion receiver that processes signals conforming to a plurality of different mobile radio standards, the method comprising the steps of:
respectively providing local oscillator signals via at least one first and one second local oscillator;
producing, during transmission, an intermediate frequency for a first mobile radio standard or a second mobile radio standard using a regenerative divider by dividing the second local oscillator signal by three;
producing, during transmission, an intermediate frequency for a third mobile radio standard using a divider that divides the second local oscillator signal by four;
IQ-modulating the respective intermediate frequency; and
delivering the resulting modulated signal jointly with one of the respective local oscillator signals to at least one of an offset PLL and a mixer.

2. The method for producing mobile radio signals as claimed in claim 1, wherein the first mobile radio standard is the Global System for Mobile Communications (GSM) standard, and the second mobile radio standard is the Universal Mobile Telecommunications System (UMTS) standard.

3. The method for producing mobile radio signals as claimed in claim 2, wherein the third mobile radio standard is the Digital Cellular System (DCS) standard.

4. An apparatus for producing mobile radio signals for a plurality of different mobile radio standards, comprising:
a direct conversion receiver;
at least one first and one second local oscillator for respectively producing local oscillator signals;
a regenerative divider that produces an intermediate frequency during transmission for a first mobile radio standard or a second mobile radio standard by dividing the second local oscillator signal by three; and
a divider that produces an intermediate frequency during transmission for a third mobile radio standard by dividing the second local oscillator signal by four;
an IQ-modulator for modulating the intermediate frequencies; and
at least one of an offset phase-locked loop (PLL), for processing a modulated signal jointly with one of the respective local oscillator signals, and a mixer, for mixing a modulated signal with one of the respective local oscillator signals.

5. An apparatus for producing mobile radio signals as claimed in claim 4, wherein the first mobile radio standard is the Global System for Mobile Communications (GSM) standard, and the second mobile radio standard is the Universal Mobile Telecommunications System (UMTS) standard.

6. An apparatus for producing mobile radio signals as claimed in claim 4, wherein the third mobile radio standard is the Digital Cellular System (DCS) standard.

* * * * *